G. J. ALBRECHT.
ENVELOP SEALING MACHINE.
APPLICATION FILED MAY 2, 1910. RENEWED NOV. 13, 1914.

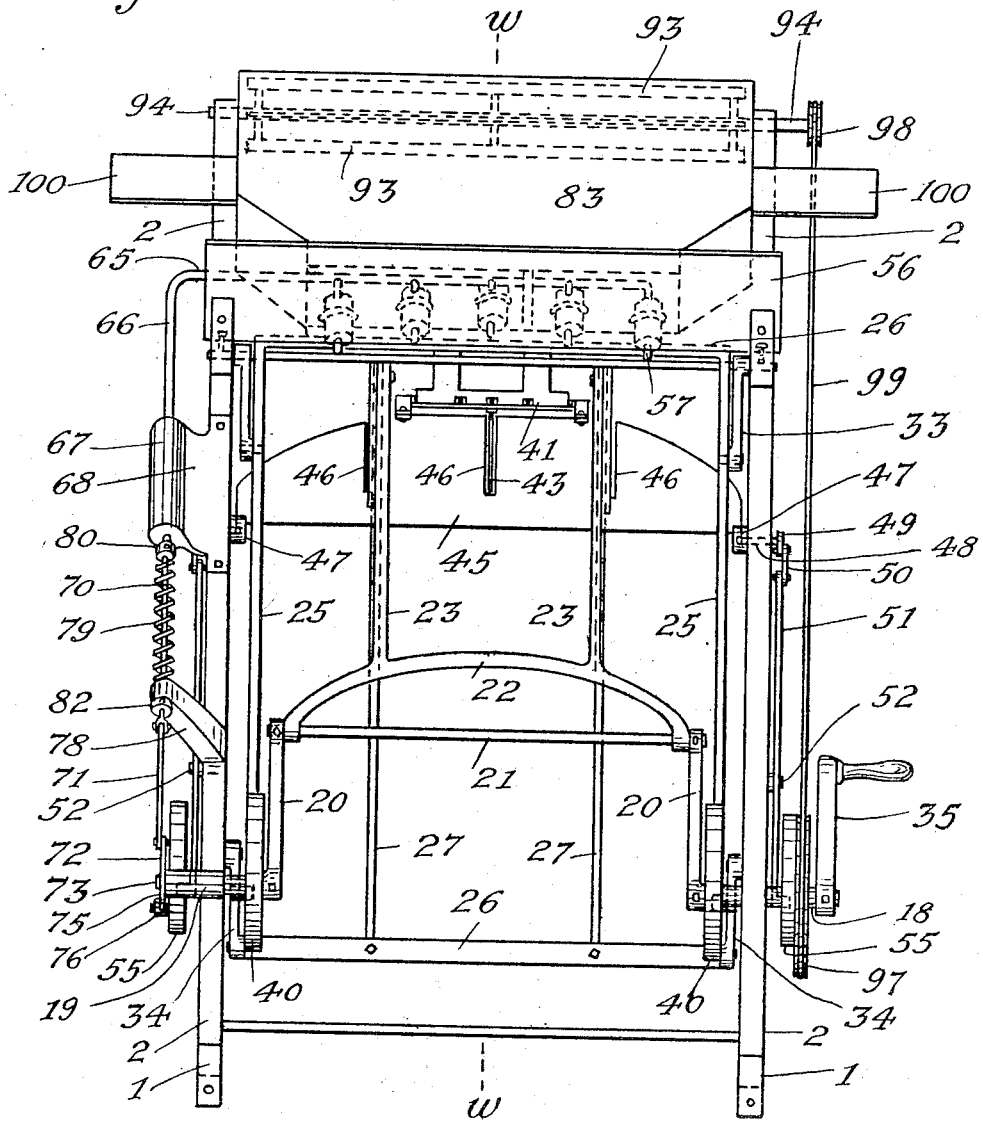

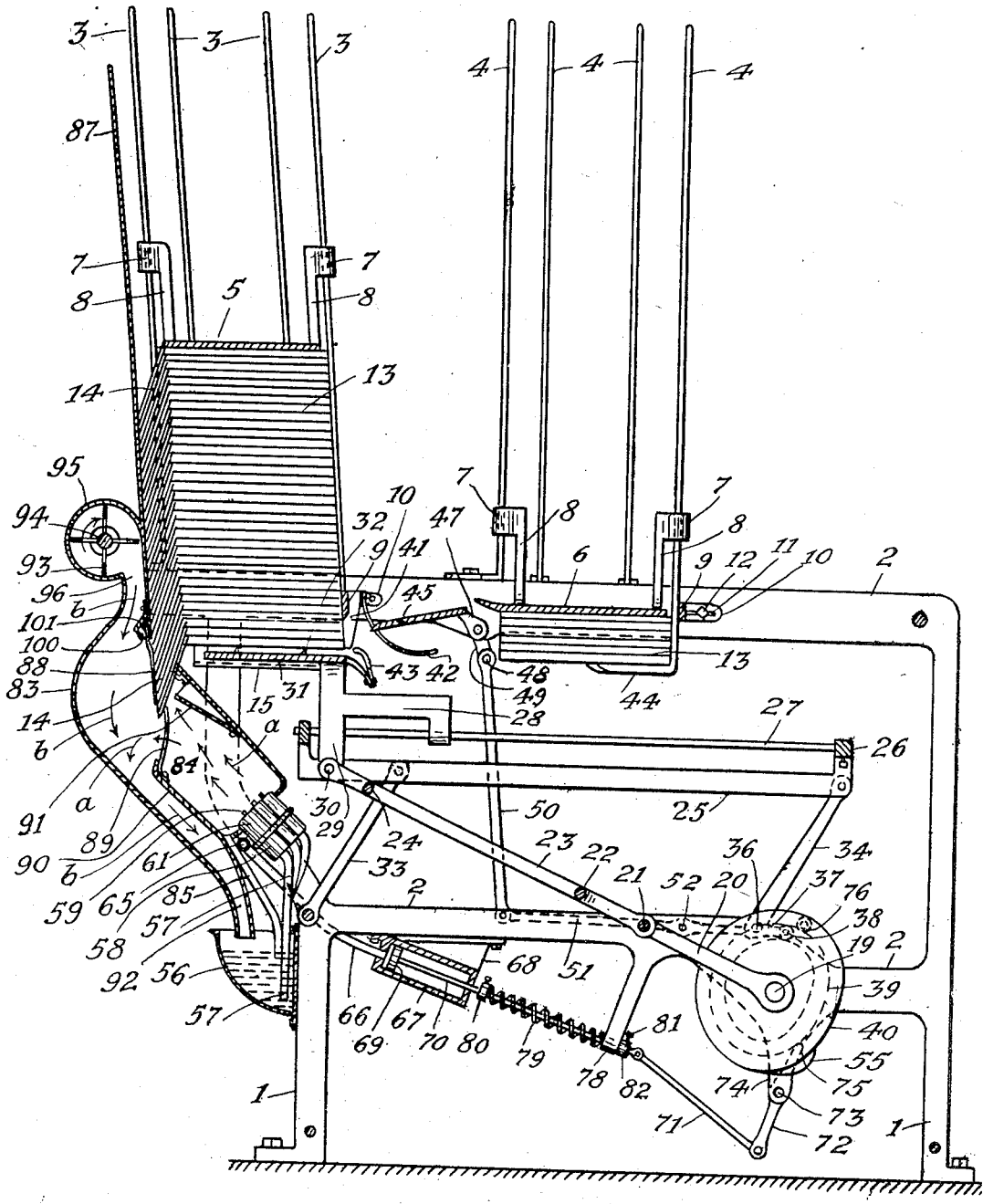

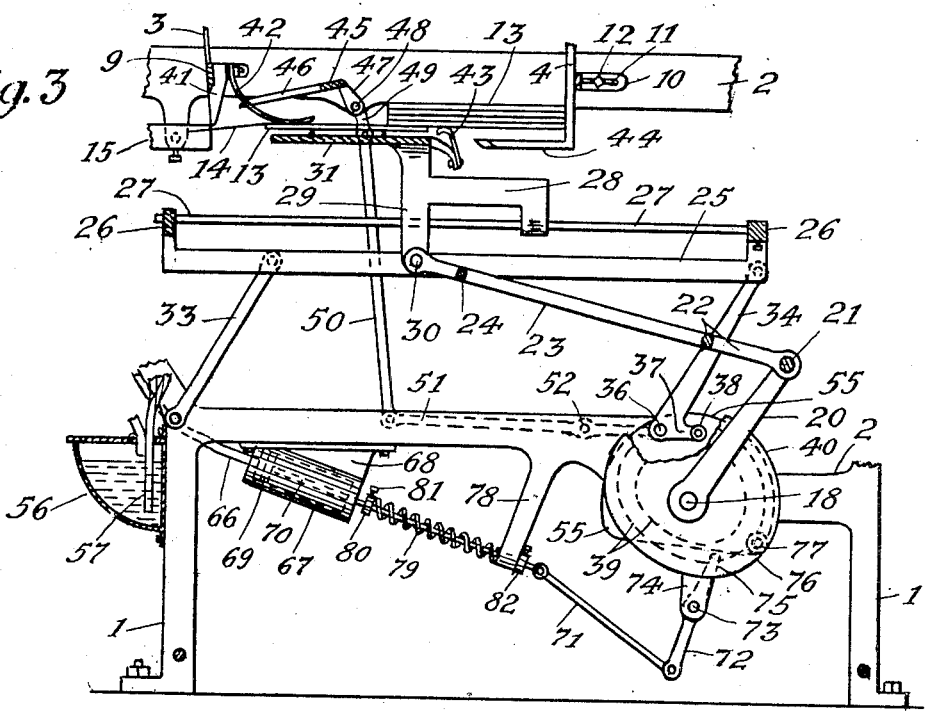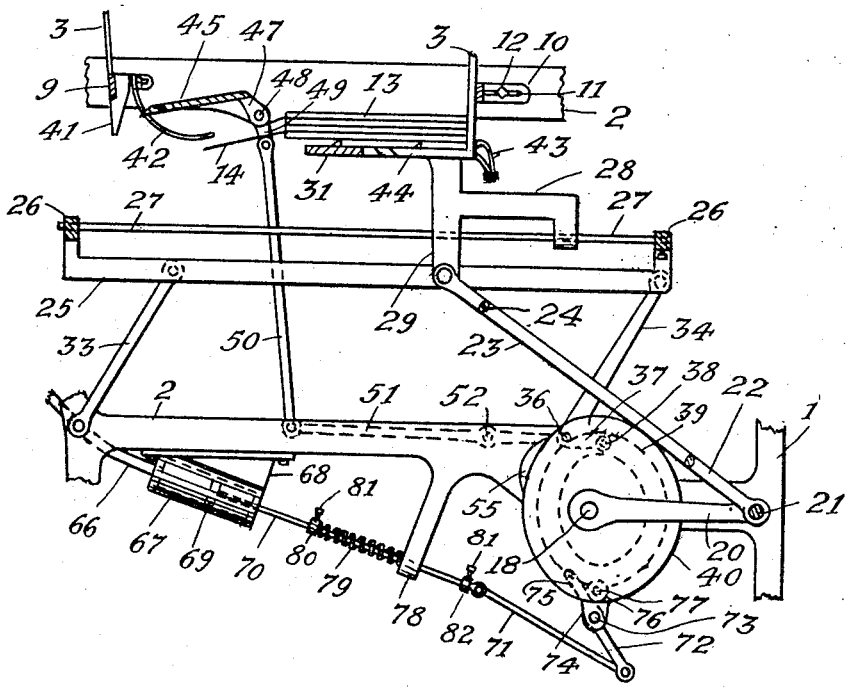

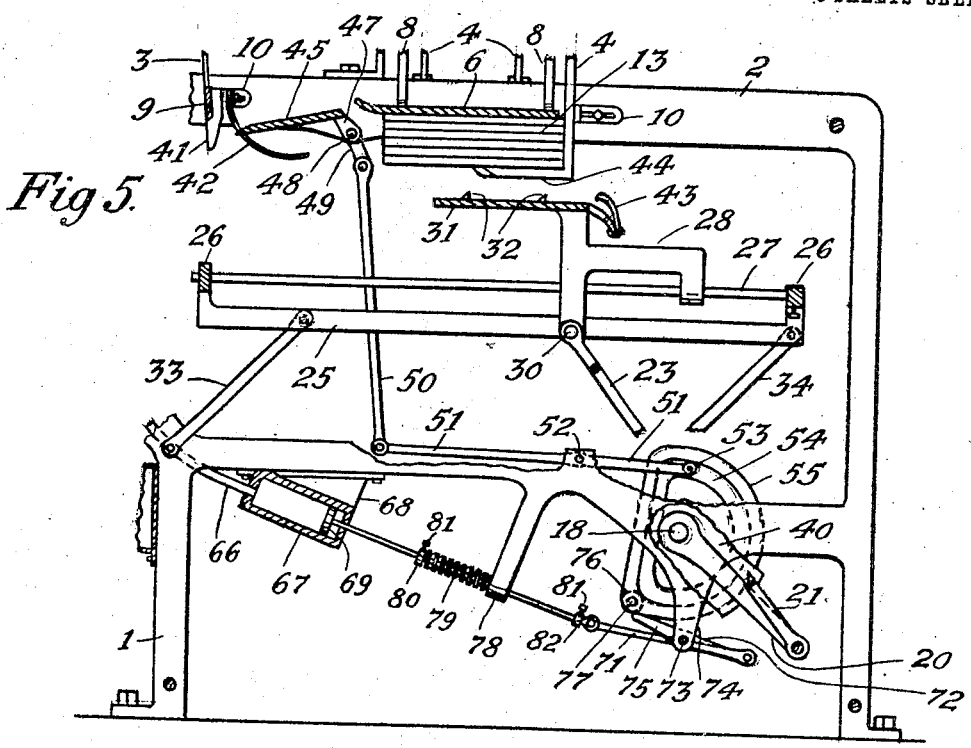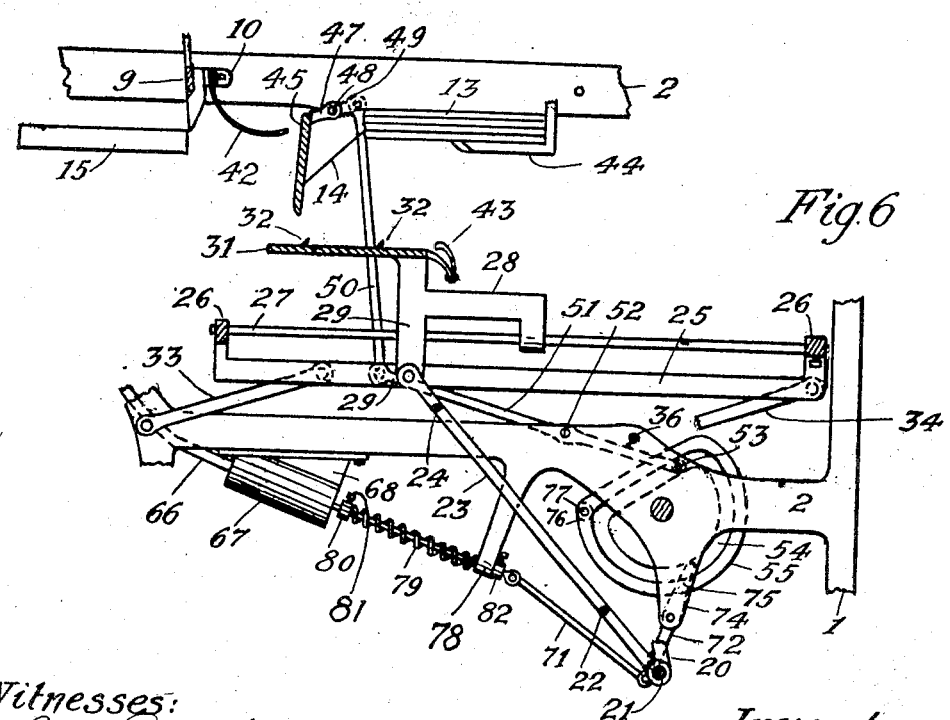

1,125,927.

Patented Jan. 26, 1915.
5 SHEETS—SHEET 5.

Witnesses
Theo. Lagaard.
H. A. Bowman.

Inventor:
Guido J. Albrecht
By P. V. Gunckel
his Attorney.

UNITED STATES PATENT OFFICE.

GUIDO J. ALBRECHT, OF MINNEAPOLIS, MINNESOTA, ASSIGNOR TO LONG MAILING MACHINE COMPANY, OF MINNEAPOLIS, MINNESOTA, A CORPORATION.

ENVELOP-SEALING MACHINE.

1,125,927.  Specification of Letters Patent.  Patented Jan. 26, 1915.

Application filed May 2, 1910, Serial No. 558,897. Renewed November 13, 1914. Serial No. 872,042.

*To all whom it may concern:*

Be it known that I, GUIDO J. ALBRECHT, a citizen of the United States, residing at Minneapolis, in the county of Hennepin and State of Minnesota, have invented certain new and useful Improvements in Envelop-Sealing Machines, of which the following is a specification.

My invention relates to envelop sealing machines, and its main objects are improvement of the means for moistening the gummed portions of the envelop flaps; and improvement of the devices for presenting the envelop flaps in succession to the action of a spraying device; for successively transferring the envelops to an assembling rack; and for closing and sealing the moistened flaps.

The invention herein described is a modification of that shown and described in my co-pending application Serial Number 489,270, filed April 12, 1909, from which it differs, among other things, in providing a spring-actuated device for periodically producing air drafts for operating the sprayer, and a housing for the sprayer having a slot in one of its walls through which the gummed flaps of the envelops are successively presented to the sprayer within the housing.

My improvements are illustrated in the accompanying drawings, in which—

Figure 7:
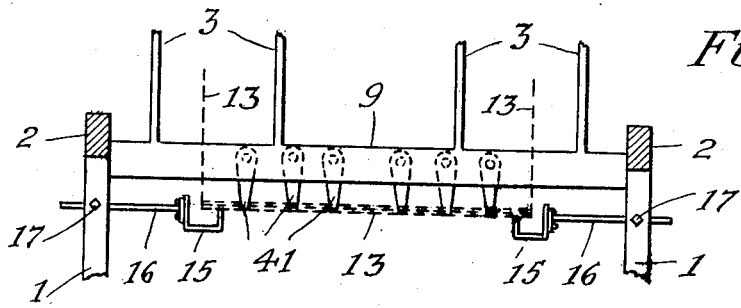
Figure 8:
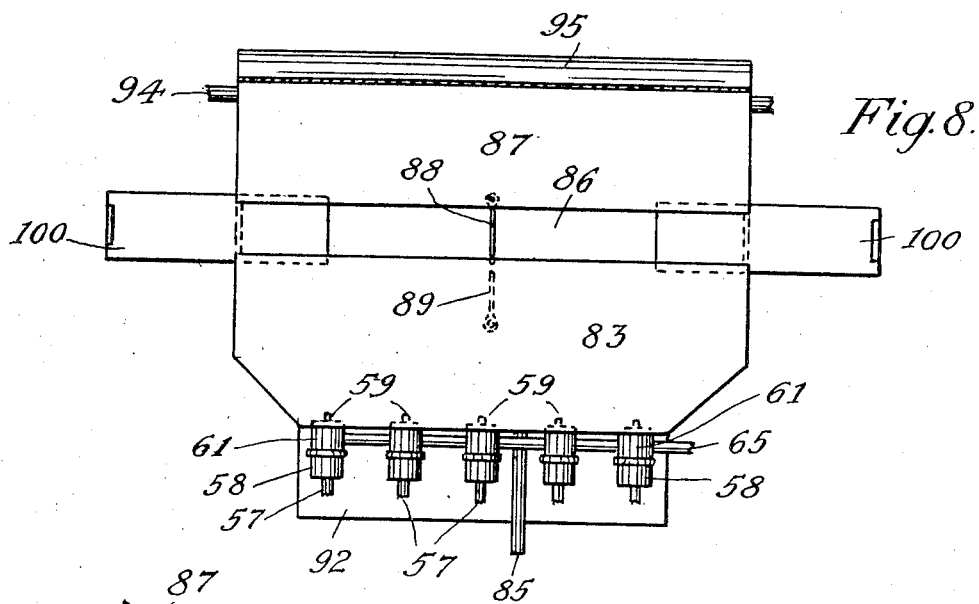
Figure 9:
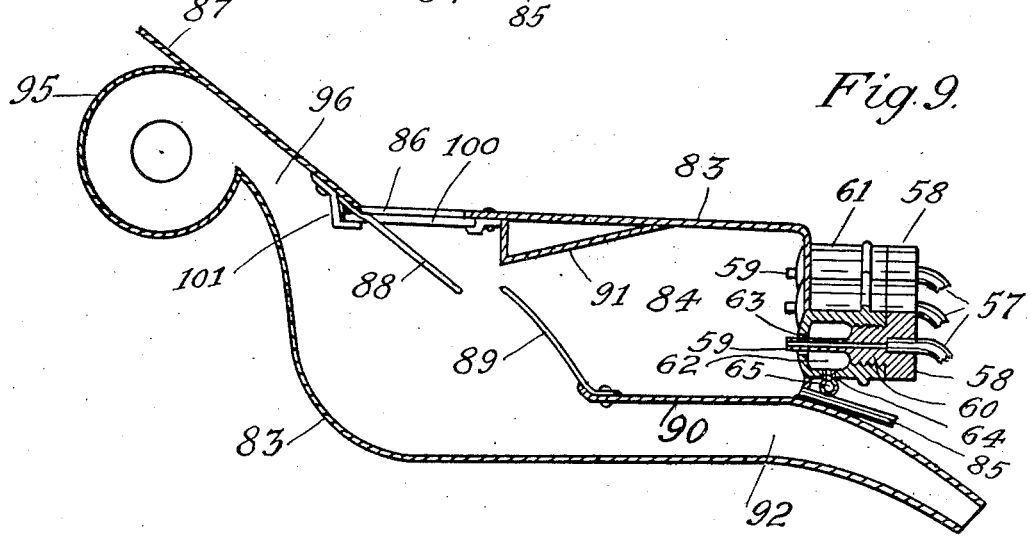

Figure 1 is a view from the under side of an envelop sealing machine embodying my improvements, showing the actuating parts in position for starting the movement of an envelop from the feed-rack to the sealing rack and for folding and sealing its flap. Fig. 2 is a vertical longitudinal section of the machine approximately on the line w—w of Fig. 1. Figs. 3 to 6 are elevations, partly sectional and similar to Fig. 2, showing the relative positions of the principal moving parts at different stages of the operation of conveying an envelop from the feed-rack to the sealing rack, folding and sealing the flaps and operating the spraying device. Fig. 7 is a side view of a portion of the feed-rack and adjustable supports for the envelops. Fig. 8 is a top view of the sprayer devices and their housing. Fig. 9 is an enlarged detail view of the sprayers and housing.

In the drawings 1 designates the vertical and 2 the horizontal members of the main frame. The feed-rack 3 for supporting the unsealed envelops consists of nearly upright rods or bars secured on the rear portion of the main frame; and the delivery or sealing rack 4 for receiving and supporting the sealed envelops consists of a similar structure secured on the upper middle portion of the main frame. Both racks are provided with suitably weighted gravitating followers 5 and 6, respectively, which are guided on the rods by means of loose rings 7 carried by arms 8 projecting upwardly from the followers. The front bars of both racks are adjustable to receive envelops of different widths by being supported on bars 9 which carry plates 10 having elongated slots 11 and which are held in place at the sides of the frame members 2 by screws 12.

The unsealed envelops 13, with their flaps 14 open and downwardly inclined, are stacked in substantially horizontal position in the feed-rack 3 on a pair of adjustable seats 15, which preferably are of channel shape and have their inner sides shorter than the outer. The stops are made adjustable toward and away from each other to adapt them for envelops of different lengths, by attaching them to rods 16 that are slidable on the frame work and are held in place by set-screws 17. See Fig. 7.

The driving-shaft 18 of the machine is journaled in the frame at one side near the front, and a driven shaft 19 is journaled in alinement with it in the opposite side of the frame. On the inner ends of these two shafts are secured crank-arms 20 the outer ends of which are connected by a rod 21, and on the rod is pivotally mounted a yoke 22 from which connecting rods 23 extend rearward in nearly horizontal direction, being braced by a cross-bar 24, and are pivoted to a carriage for conveying the envelops in succession from the moistening to the sealing positions. The main frame of this carriage comprises two horizontal pieces 25 and cross-bars 26 which connect their ends and support parallel horizontal rods 27. On these rods are arranged slidable brackets 28 having downward arms 29, to which the connecting-rods 23 are pivoted by pintles 30. On these brackets is mounted in horizontal position a carrier-plate 31 provided with teeth or points 32 for engaging the open envelop and carrying it from the feed-rack to the sealing-rack. The end portions of the carriage members 25 are connected by radius-bars 33 and 34 to the sides 2, whereby the carriage frame is maintained at all times in horizontal position and is caused during portions of its movements to advance toward and recede from the envelop racks.

The extreme rearward position of the carriage is illustrated in Figs. 1 and 2. Upon partial rotation of the driving-shaft, about a quarter turn, by means of an operating crank 35, or otherwise, the carriage and its connections will be in approximately the positions shown in Fig. 3, and the carrier 31 will have moved an envelop from the feed-rack to position between the racks about as there shown, and a further operation of the crank about a quarter turn will carry the envelop to the sealing rack, as indicated in Fig. 4. Then, upon further rotation of the driving-shaft the carriage will be moved away from contact with the envelop and toward the front of the machine and downward, as indicated in Fig. 5. To aid in effecting this cycle of movements and to retract the carriage a proper distance, the lower radius bars 34 are provided at their fulcrum points 36 with short angular arms 37 extending forward and which carry pins 38 that engage in eccentric grooves 39 formed in cam-wheels 40 that are fast to the driving and driven shafts 18 and 19. The operation of the arms 37 by reason of the engagement of their pins 38 in the cam-grooves 39 serves to move the radius bars toward the base of the machine after the carriage has delivered an envelop to the delivery rack and during the earlier portion of the rearward travel of the carriage, as shown in Figs. 5 and 6.

The feed-rack cross-bar 9, which is supported by the frame members 2, is provided with a resilient support or a series of resilient fingers 41, fastened to its under side and extending below its lower edge for holding one or more of the lower envelops in place. These fingers are preferably composed of rubber and made of somewhat wedge-shape to adapt their lower ends to be easily bent to allow the envelop that is engaged by the carrier 31 to be removed from the rack. The same bar 9 also supports a series of laterally-extending curved springs 42 which serve to yieldingly hold the envelop to contact with the carrier during a portion of its passage from the feed-rack to the storing rack. And to the inner end of the carrier are attached presser-springs 43 for lifting the lower envelops in the storing rack 4 to make room between them and their supports or seats 44 for the advancing envelop as it is being presented by the carrier, as indicated in Fig. 3.

Intermediate the feeding and storing racks is located the flap-folder 45, consisting of a flat plate provided with slots 46 to permit it to swing past the springs 42, and it is carried on cranks 47 on the inner ends of short shafts 48 that are journaled on the frame pieces 2. On the outer ends of the shafts 48 are cranks 49 to which connecting-rods 50 are pivoted for connecting them to the longer arms of levers 51 that are fulcrumed at 52 to the frame members 2; and the shorter lever arms are provided with pins 53 which engage in cam-grooves 54 in cam-wheels 55 on the shafts 18 and 19.

The moistening of the gummed portions of the envelops is effected by the following devices: A water reservoir 56 is supported at the rear portion of the machine, and from it a series of pipes 57 extends in upward direction to an atomizer or spraying device of any suitable construction. In the style of atomizer selected for illustration each pipe 57 has attached to it a head 58 which carries a nozzle 59, the body portion 60 of which is screw-threaded. A small cylinder 61 is screwed onto the nozzle body and provides an interior air-chamber 62 and a narrow passage-way 63 for the air-current around the sides of the nozzle. Each of the air chambers 62 is in communication with a branch pipe 64 that is connected to an air-supply pipe 65, and the latter is supplied with air under pressure through a pipe 66 that is connected to an air-pump, or other source of supply of air under pressure.

The air-pump may be of any suitable construction; as illustrated, it consists of a barrel 67 supported by a bracket 68 from the frame side 2, and contains a piston 69 operated by a piston-rod 70 which is pivotally connected to a connecting-rod 71 that is operatively connected to the lower arm 72 of a lever that is fulcrumed at 73 to a hanger 74 depending from the frame piece 2. The other lever-arm 75 is arranged in position to be engaged by a roller 76 on a pin 77 provided on the adjacent cam-wheel 55 during a portion of the rotation of that cam, the swing of the lever being from about the position shown in Fig. 2 to that shown in Fig. 5. The piston-rod 70 is supported and guided by a hanger 78 from the frame member 2, and between the hanger and the pump a coil spring 79 is placed on the rod, one end of the spring bearing against the hanger and the other against an adjustable collar or stop 80 that is held in place by a set-screw 81. A similar adjustable collar or stop 82 is provided between the hanger 78 and the joint of the piston-rod and the connecting rod. The rotation of the cam-wheel from the position shown in Fig. 2 to that shown in Fig. 5 will serve to compress the spring 79, as shown in the latter figure, and a slight further movement of the cam will free the lever arm 75 and permit the spring 79 to thrust the piston rod and piston to produce an air-blast through the pipe 66. The arrangement and connections of the operating mechanisms are such that the air pump will be operated periodically and at proper intervals to spray the envelop flaps as they are successively exposed by the removal of those in advance by the operation of the carrier. And the operation of the air-pump by the action of the spring insures a brief but timely and efficient air blast for producing and projecting the desired amount of spray.

To avoid undesirable moistening of the envelops and to enable the spray to be directed to the gummed portions only of the flaps, a box-like housing 83 is mounted on the frame at an inclination of approximately 45° to the feed-rack and inclosing the nozzles 59 and providing a chamber 84 for receiving their discharge. The water that may accumulate in this chamber is allowed to flow back to the tank through a drain pipe 85.

In the top wall of the housing 83 is a transverse slot 86 through which project the flaps 14 of several of the lower envelops in the feed-rack. A plate 87 in rear of the feed-rack and parallel with its posts and supported either on the frame members 2 or the housing 83 has its lower end in the housing slot 86, and to it are attached a series of depending guide-fingers 88, preferably of wire, for preventing movement of the flaps toward the rear of the machine. Below these fingers are other guide-fingers 89 for preventing forward deflection of the flaps, which fingers extend upwardly from and are secured to a longitudinal plate or false bottom 90 in the housing 83. The guide-plate 87 and the fingers 88 and 89 serve to hold in alinement the extended flaps of the racked envelops and guide them to the moistening point.

For directing the spray to the gummed margin of the flap and preventing the discharge of spray to an objectionable extent through the slot 86 in front of the flap a deflector plate 91, preferably of convex form, is provided on the upper wall of the housing at the front of the slot.

The forward portion of the false bottom 90 is extended downwardly beneath the drain pipe 85 and toward the water tank and the rearward portion terminates approximately in line with the edges of the envelop flaps. The housing bottom proper is also extended downwardly to coöperate with the false bottom extension to form a duct 92 leading, preferably to the water tank, for the discharge of air, spray, and water.

To aid in directing the spray after it has passed the envelop flaps into and through the exhaust duct 92 means are provided for causing an air-current to pass downwardly in rear of the flaps and into the duct. As shown, this is done by a fan, consisting of wings 93 on a transverse shaft 94 in a fan-case 95 located above the housing and in rear of the guide-plate 87. An opening 96 in the top of the housing admits the air-current from the fan to the sprayer housing. The fan shaft may be mounted on the frame members 2 or the housing 83 and driven from the driving shaft 18 by means of pulleys 97 and 98 and a belt 99. The course of the spray is indicated by the arrows $a$ and that of the air-current from the fan by the arrows $b$. In this way a spreading or diffusion of the spray in direction toward the envelops is avoided and only the exposed flap receives any portion of the moisture.

To regulate the length of the slot 86 to accommodate for envelops of different lengths adjustable slides 100 are provided at the ends of the slot and arranged in guides 101, which allow them to be moved to and fro.

In operation, starting with the operative parts of the machine in the positions shown in Figs. 1 and 2, the initial operation of the driving-shaft will start the carrier 31 forward on its guides 27, causing the forward edge of the engaged envelop to bend the points of its supporting fingers 41 to allow the envelop to pass; a slight further movement will bring the envelop to contact with the resistance springs 42, which serve to hold the envelop against the face of the advancing carrier, (see Fig. 3); and as the forward edge of the carrier nears the stack of envelops on the rack 4 the presser springs 50 will engage them and press them upward from the stops 44 to make room for the advanced envelop. These operations are effected by about a third of a turn of the shaft 18 which serves to swing the cranks 20 from the position shown in Figs. 1 and 2 to that shown in Fig. 3; and a short further rotation will serve to seat the envelop in the sealing rack, as shown in Fig. 4. When the envelop has thus been delivered, further rotation of the driving shaft to initial position will serve to rotate the cam-wheel 55 and thereby operate the flap folder 45 to engage the flap and bend and seal it to the racked envelop, as shown in Fig. 6. During approximately the latter half of the shaft rotation the cam-wheel 40 will serve to so actuate the radius bar 34 as to retract the carriage from the position shown in Fig. 5 and to move it to the position shown in Fig. 6 and return it to the operative position shown in Figs. 1 and 2.

During that period of the operation which moves the carrier 31 from its position beneath the feed rack (Fig. 2) to that beneath the sealing rack (approximately as shown in Fig. 4) the rotation of the cam 55 will have moved the pin 77 to position to cause its roller 76 to contact with the lever arm 75 and begin the oscillation of that lever to reciprocate the connecting-rod 71 and piston-rod 70 and thereby compress the spring 79, as indicated in Fig. 4. A further rotation of the cams, about as indicated in Fig. 5, will move the carriage to its lowest position and complete the compression of the spring 79, and a slight further movement of the cams will free the roller 76 from the lever arm 75 and thereby permit the spring to expand, as indicated in Fig. 6. This expansion of the spring 79 serves to thrust the piston rod and cause the piston 69 to send a quick-moving current of air through the pipe 66 to the spraying devices. The air-blasts from the pump enter the series of sprayer chambers 62 and flow out through the openings 63 around the nozzles 59 and produce sprays, which are projected against the exposed envelop flap 14, and the air and surplus spray are discharged, along with the air-current from the fan, through the lower housing outlet 92.

Having described my invention, what I claim and desire to secure by Letters Patent is—

1. In an envelop-sealing machine, the combination with means for successively exposing the gummed envelop flaps to be moistened, of spring-actuated means for producing air-blasts, means for periodically placing said spring-actuated means in operative position, and a sprayer operated thereby for spraying the flaps as they are successively exposed.

2. In an envelop-sealing machine, a sprayer for moistening the envelop flaps, a spring-actuated device for producing air-blasts for operating the sprayer, and means for periodically placing said device in operative position.

3. In an envelop-sealing machine, a sprayer, spring-actuated means for projecting air-blasts through the sprayer, means for periodically placing said projecting means in operative position, means for exposing successive envelop flaps to the action of the sprayer, and means for removing them when sprayed.

4. In an envelop-sealing machine, a sprayer, spring-actuated means for projecting air-blasts through the sprayer, means for periodically placing said projecting means in operative position, means for stacking envelops and successively presenting their flaps to the action of the sprayer, a carrier for removing the envelops in succession, and mechanism for producing timely operations of the carrier.

5. In an envelop-sealing machine, a sprayer, spring-actuated means for projecting air-blasts through the sprayer, means for periodically placing said projecting means in operative position, means for stacking envelops and successively presenting their flaps to the action of the sprayer, and means for directing the spray to the gummed portion of the exposed envelop flap.

6. In an envelop-sealing machine, a sprayer, spring-actuated means for projecting air-blasts through the sprayer, means for periodically placing said projecting means in operative position, means for stacking envelops and successively presenting their flaps to the action of the sprayer, a carrier for removing the envelops in succession, mechanism for producing timely operations of the carrier, and connections between the carrier actuating mechanism and the air-blast device for controlling the operation of the latter.

7. In an envelop-sealing machine, means for stacking and holding envelops with their flaps open, means for removing them in succession, a sprayer, an air-pump therefor, a spring for thrusting the pump piston, means for periodically placing said spring in operative position, and means for causing timely operation of the spring.

8. In an envelop-sealing machine, means for stacking and holding envelops with their flaps open, a carrier for removing the envelops in succession, mechanism for producing timely operations of the carrier, a sprayer, a spring for thrusting the pump piston, and connections between the spring and the carrier mechanism for causing timely operation of the spring.

9. In an envelop-sealing machine, a sprayer, a housing therefor having a slot in one of its walls, means for successively presenting and guiding the gummed flaps of envelops through said slot and within the housing, means for periodically supplying air-blasts to the sprayer for spraying the exposed flap, and means for removing the envelops in succession as their flaps are moistened.

10. In an envelop-sealing machine, a sprayer, a housing therefor having a slot in one of its walls, means for successively presenting the gummed flaps of envelops through said slot and within said housing, guides for holding the presented flap in proper position in the casing, means for periodically projecting sprays, and means for removing the envelops in succession as their flaps are moistened.

11. In an envelop-sealing machine, a sprayer, a housing therefor having a slot in one of its walls, means for successively presenting the gummed flaps of envelops through said slot and within said housing, guides for holding the presented flap in proper position in the casing, means for periodically projecting sprays, a spray-deflector for directing the spray to the flap, and means for removing the envelops in succession as their flaps are moistened.

12. In an envelop-sealing machine, a sprayer, a housing therefor having a slot in one of its walls, means for successively presenting and guiding the gummed flaps of envelops through said slot and within the housing, adjusting devices for regulating the length of the slot for envelops of different lengths, means for periodically supplying air-blasts to the sprayer for spraying the exposed flap, and means for removing the envelops in succession as their flaps are moistened.

13. In an envelop-sealing machine, a sprayer, a housing therefor having a slot in one of its walls for receiving the envelop flaps, means for successively presenting the flaps through said slot and within the housing, opposite air inlet and outlet ports in the housing in rear of said slot, means for directing an air-current through said ports, and means for removing the envelops in succession as their flaps are moistened.

14. In an envelop-sealing machine, a sprayer, a housing therefor having a slot in one of its walls for receiving the envelop flaps, means for successively presenting the flaps through said slot and within the housing, a false bottom in the casing below the edges of the flaps, an air inlet port in the top of the housing, an outlet in its bottom, means for directing an air-current through said ports, and means for removing the envelops in succession as their flaps are moistened.

15. In an envelop-sealing machine, a sprayer, a housing therefor having a slot in one of its walls for receiving the envelop flaps, means for successively presenting the flaps through said slot and within the housing, a false bottom in the casing below the edges of the flaps, a deflector above the false bottom for directing the spray to the flaps, an air inlet port in the top of the housing, an outlet in its bottom, means for directing an air-current through said ports, and means for removing the envelops in succession as their flaps are moistened.

In testimony whereof I have signed my name to this specification in the presence of two subscribing witnesses this 25th day of April, 1910.

GUIDO J. ALBRECHT.

Witnesses:
 H. A. BOWMAN,
 P. H. GUNCKEL.